United States Patent
Zhang

(10) Patent No.: US 9,921,723 B2
(45) Date of Patent: Mar. 20, 2018

(54) METHOD FOR SWITCHING PAGES, AND ELECTRONIC DEVICE AND NON-TRANSITORY COMPUTER READABLE STORAGE MEDIUM FOR PERFORMING SAME

(71) Applicant: TENCENT TECHNOLOGY (SHENZHEN) COMPANY LIMITED, Shenzhen, Guangdong (CN)

(72) Inventor: Fan Zhang, Shenzhen (CN)

(73) Assignee: TENCENT TECHNOLOGY (SHENZHEN) COMPANY LIMITED, Shenzhen, Guangdong (CN)

(*) Notice: Subject to any disclaimer, the term of this patent is extended or adjusted under 35 U.S.C. 154(b) by 407 days.

(21) Appl. No.: 14/566,352

(22) Filed: Dec. 10, 2014

(65) Prior Publication Data

US 2015/0095836 A1   Apr. 2, 2015

Related U.S. Application Data

(63) Continuation of application No. PCT/CN2013/076817, filed on Jun. 5, 2013.

(30) Foreign Application Priority Data

Jun. 13, 2012   (CN) .......................... 2012 1 0195019

(51) Int. Cl.
*G06F 3/048* (2013.01)
*G06F 3/041* (2006.01)
(Continued)

(52) U.S. Cl.
CPC .......... *G06F 3/0483* (2013.01); *G06F 3/0485* (2013.01); *G06F 3/0488* (2013.01)

(58) Field of Classification Search
CPC .......... G06F 3/048; G06F 3/041; G06F 17/30; G06F 3/00; G06F 17/00
See application file for complete search history.

(56) References Cited

U.S. PATENT DOCUMENTS 5,847,972 A * 12/1998 Eick ...................... G06F 11/323
345/440
8,205,168 B1 * 6/2012 Van Slembrouck .. G06F 3/0483
715/784
(Continued)

FOREIGN PATENT DOCUMENTS

CN   201725321 U   1/2011
CN   101968708 A   2/2011
(Continued)

OTHER PUBLICATIONS

Treehouse, How to Draw with HTML 5 canvas, Sep. 9, 2009, pp. 1-24.*

(Continued)

*Primary Examiner* — Hugo Molina
(74) *Attorney, Agent, or Firm* — Tim Tingkang Xia, Esq.; Locke Lord LLP

(57) ABSTRACT

A method for switching page includes creating several sequential virtual pages through loading a page script, and displaying the virtual pages on a touch screen of an electronic device; collecting touching positions of a user in the displayed virtual pages; and performing switching pages to the virtual pages displayed on the touch screen according to the touching positions. An electronic device for switching page includes a page virtual module used to create several sequential virtual pages through loading the page script, and display the virtual pages on the touch screen; a collecting module used to collect touching positions of a user in the displayed virtual page; and a processing module used to (Continued)

perform switching pages to the virtual page displayed on the touch screen according to said touching positions.

13 Claims, 9 Drawing Sheets

(51) Int. Cl.
*G06F 17/30* (2006.01)
*G06F 3/00* (2006.01)
*G06F 3/0483* (2013.01)
*G06F 3/0488* (2013.01)
*G06F 3/0485* (2013.01)

(56) References Cited

U.S. PATENT DOCUMENTS

| | | | | |
|---|---|---|---|---|
| 8,245,130 | B1* | 8/2012 | Lloyd | G06F 17/30905 715/234 |
| 2008/0282147 | A1* | 11/2008 | Schorr | G06F 17/212 715/247 |
| 2010/0175018 | A1* | 7/2010 | Petschnigg | G06F 3/0483 715/776 |
| 2011/0310104 | A1* | 12/2011 | Dicke | G06T 13/80 345/473 |
| 2012/0204102 | A1* | 8/2012 | Gwin | G06F 17/248 715/253 |
| 2012/0313876 | A1* | 12/2012 | Smith | G06F 9/4443 345/173 |
| 2013/0044066 | A1* | 2/2013 | Monteux | G06F 3/0483 345/173 |
| 2013/0111334 | A1* | 5/2013 | Liang | G06F 3/0488 715/252 |
| 2013/0145290 | A1* | 6/2013 | Weber | G06F 3/04883 715/760 |
| 2013/0283192 | A1* | 10/2013 | Kranzberg | G06F 3/04815 715/760 |
| 2013/0298005 | A1* | 11/2013 | Mayhew | G06F 17/2247 715/234 |
| 2013/0326343 | A1* | 12/2013 | Phillips | G06F 17/30905 715/252 |
| 2014/0026096 | A1* | 1/2014 | Zhang | G06F 3/0485 715/784 |

FOREIGN PATENT DOCUMENTS

| | | |
|---|---|---|
| CN | 102033935 A | 4/2011 |
| CN | 102385473 A | 3/2012 |

OTHER PUBLICATIONS

International Search Report issued by State Intellectual Property Office of the P. R. China dated Aug. 22, 2013 for Application No. PTC/CN2013/076817.
State Intellectual Property Office of the P.R.C., " Office Action for CN Application No. 201210195019.7", dated Oct. 12, 2015, China.
State Intellectual Property Office of the P.R.C., "Patent Cooperation Treaty International Search Report for PCT/CN2013/076817", published on Dec. 19, 2013, China.

* cited by examiner

METHOD FOR SWITCHING PAGES, AND ELECTRONIC DEVICE AND NON-TRANSITORY COMPUTER READABLE STORAGE MEDIUM FOR PERFORMING SAME

CROSS-REFERENCE TO RELATED APPLICATIONS

The present application is a continuation application of International Application No. PCT/CN2013/076817, filed Jun. 5, 2013, which itself claims the priority to Chinese application No. 201210195019.7 filed Jun. 13, 2012, which are incorporated herein by reference in their entireties.

TECHNICAL FIELD

The present disclosure relates to network technologies, and more particularly relates to a method, apparatus and computer storage medium for switching pages.

BACKGROUND

With the development of mobile terminals, such as smart phones and tablet PCs, more and more Apps accomplish a control command input through a user's touching operation on a touch screen of the mobile terminal. Especially, when browsing a page using an App, a switching between different pages can be achieved through the user's touching operation on the touch screen, e.g. clicking or sliding. For example, the user clicks "page up" and "page down" buttons on a page displayed by the touch screen to switching page.

To further simplify a user's touch operation in the touch screen, a website usually provides a touching version website, the user only needs to click on the left side or the right side of the touch screen freely to achieve a page up or a page down operation of the page in real time. But the touch version website can only be achieved in a specific browser, a free page switching of a web page of the touching version website cannot be achieved in various different browsers, lacking support from a cross-browser platform.

SUMMARY

Based on this, in order to overcome the problem of the page of the touching version website cannot be switched freely in different browsers, it is necessary to provide a method for switching page which can achieve a cross-browser platform.

Furthermore, it is necessary to provide an apparatus for switching page which can achieve a cross-browser platform.

Moreover, it is necessary to provide a computer storage medium which can achieve a cross-browser platform.

A method for switching page includes the following steps:
creating a plurality of sequential virtual pages through loading a page script, and displaying the virtual pages on a touch screen;
collecting touching positions on displayed virtual pages;
performing switching pages to the virtual pages displayed on the touch screen according to the touching positions.

A apparatus for switching page includes:
a page virtual module configured to create a plurality of sequential virtual pages through loading a page script, and display the virtual pages on a touch screen;
a collecting module configured to collect touching positions on displayed virtual pages;

a processing module configured to perform switching pages to the virtual pages displayed on the touch screen according to the touching positions.

A computer storage medium for storing computer executable instruction, the computer executable instruction is configured to execute the method for switching page, the method includes:
creating a plurality of sequential virtual pages through loading a page script, and displaying the virtual pages on a touch screen;
collecting touching positions in displayed virtual pages;
performing switching pages to the virtual pages displayed on the touch screen according to the touching positions.

In the above method, apparatus and computer storage medium for switching page, a plurality of sequential virtual pages are created through loading the page script, and then they are displayed on the screen. Touching positions in the displayed virtual page are collected, switching pages is performed to virtual pages corresponding to several pages according to the touching positions, in the above switching process, the corresponding page script is directly loaded by different browsers, the server side is uniformly planed, and it is applied to different browsers. Virtual page can be switched by any browser according to the page script, a page switching of cross-browser platform is enabled.

DETAILED DESCRIPTION OF THE EMBODIMENTS

Figure 1:
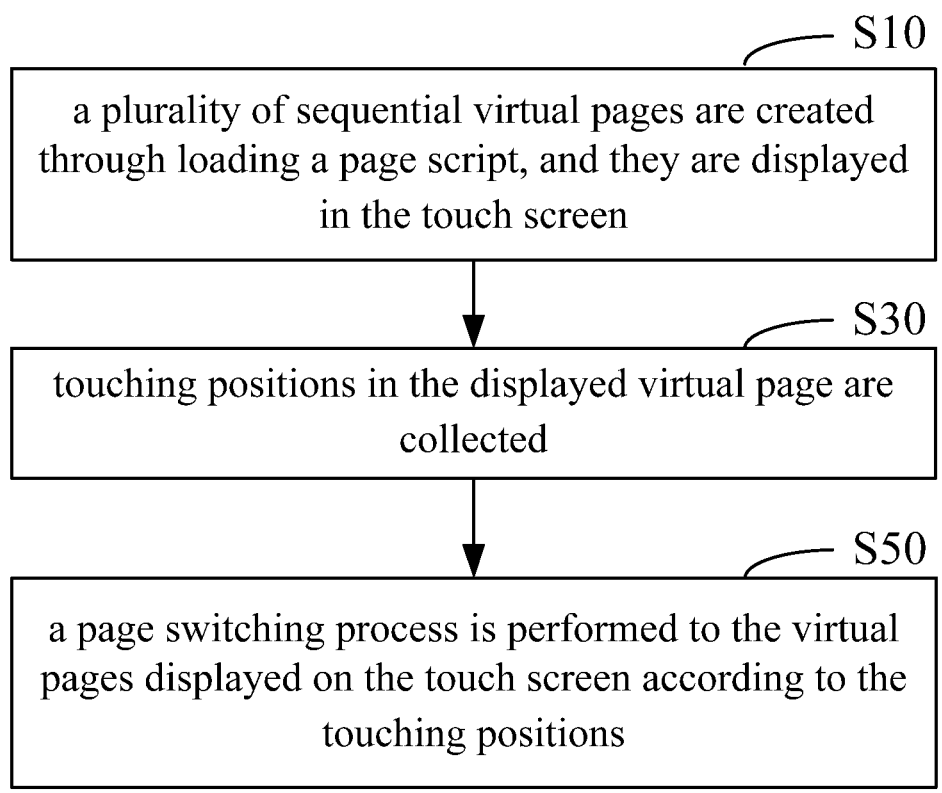
FIG. 1 is a flow chart of a method for switching page according to one embodiment.

FIG. 1 illustrates an embodiment of a page switching method implemented on an electronic device in accordance with some embodiments of the application. The method is, optionally, governed by instructions that are stored in a non-transitory computer readable storage medium and that are executed by one or more processors of the electronic device. Each of the operations shown in FIG. 1 may correspond to instructions stored in a computer memory or non-transitory computer readable storage medium. The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in the method of FIG. 1 may be combined and/or the order of some operations may be changed. In one embodiment, the method may include:

Step S10, a plurality of sequential virtual pages are created through loading a page script, and the virtual pages are displayed in the touch screen.

In one embodiment, the page script records a corresponding page style, the page can be loaded through a browser and the page script, and then it is displayed in the browser interface. Specifically, the page script is obtained according to a user's browsing request, then a plurality of sequential virtual pages are created in a loading process of the page script, the virtual page corresponding to a browsing page requested by a user is displayed in the touch screen.

The virtual page is a Div object, data in each virtual page can be saved in the form of arrays. Preferably, the number of the created virtual pages is three, and the three virtual pages correspond to a browsing page requested by a user, and a previous page and a next page adjacent to the browsing page requested by the user. Correspondingly, the previous page, the browsing page requested by the user and the next page are saved by arrays of txt[1], txt[2], and txt[3]. Under the premise of saving storage space, the creation of three sequential virtual pages can ensure a fluency and smoothness during the process of switching pages, thus the page switching is advantageously achieved in a mobile terminal. Moreover, the switching page can be achieved through the virtual page, the created virtual pages can be reused in further switching page process, object creating operations can be minimized, and the performance is improved.

Furthermore, the page script is achieved through HTML5 web page programming language, a process of opening a webpage is a process of obtaining the page script and loading the page script, which can be accomplished through load event or DOMContentLoaded event of the page. Thus an initialization function of creating the virtual page can be registered in advance to the handling hook of the load event or the DOMContentLoaded event of the page.

Step S30, touching positions in the displayed virtual page are collected.

In the illustrated embodiment, a contacting point between the user and the touch screen is a touching point, the corresponding touching positions of the touching point can be characterized by coordinates.

Step S50, switching pages is performed to the virtual pages displayed on the touch screen according to the touching positions.

In the illustrated embodiment, an operating intention on the touch screen of the user can be determined according to the collected touching positions, then whether the virtual page displayed on the touch screen is page up or page down is determined, thus page switching between the displayed virtual page and adjacent virtual page can be achieved.

Figure 2:
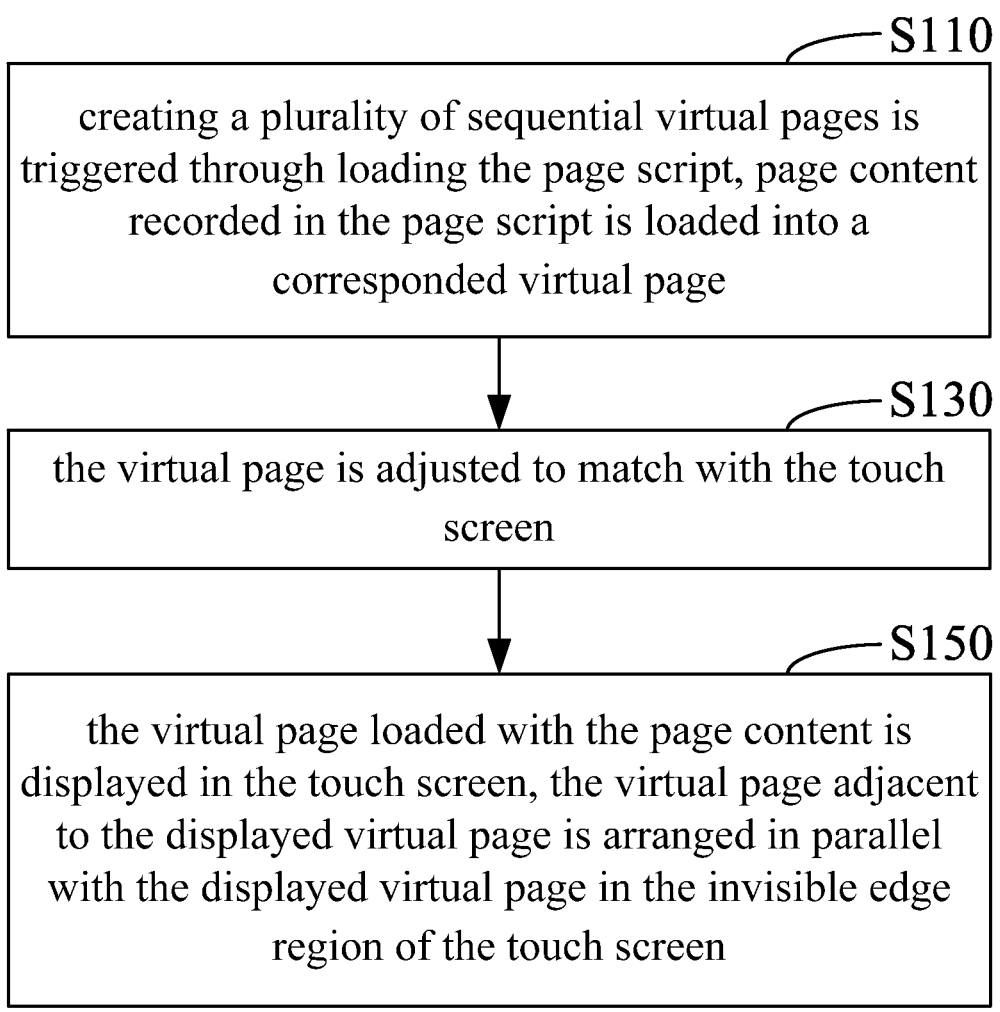
FIG. 2 is a flow chart of creating a plurality of sequential virtual pages through loading a page script, and displaying the virtual pages on a touch screen in FIG. 1.

Referring to FIG. 2, in one embodiment, the step S10 specifically includes:

Step S110, a plurality of sequential virtual pages are created, which is triggered through loading the page script, page content recorded in the page script is loaded into a corresponding virtual page.

In the illustrated embodiment, a plurality of virtual pages are created in a loading process of the page script, a plurality of pages corresponding to the created virtual pages are sequential, for example, the three created virtual pages are corresponding to the $5^{th}$ page, the $6^{th}$ page, and the $7^{th}$ page respectively.

The page script records information such as page style and page content, thus recorded page content is extracted from the page script in the loading process of the page script, then the page content is loaded into the virtual page. For example, in the three virtual pages corresponding to the $5^{th}$, $6^{th}$, and $7^{th}$ created pages, as described above, the loaded page script is the page script of the $6^{th}$ page, after the page content is extracted from the page script, the page content is loaded into the second virtual page of the three sequential virtual pages, the page content will be saved in the form of arrays.

Step S130, the virtual page is adjusted to match with the touch screen.

In the illustrated embodiment, the size of the virtual page is adjusted according to the size of the window of the touch screen to meet a need for full screen reading or other reading modes. For example, the height and width of the virtual page can be adjusted, which makes the width and height of the virtual page equal to the width and height of the window of the screen, then the virtual page is displayed in full screen for users.

Step S150, the virtual page loaded with the page content is displayed in the touch screen, the virtual page adjacent to the displayed virtual page is arranged in parallel with the displayed virtual page in the invisible edge region of the touch screen.

In the illustrated embodiment, a plurality of sequential virtual pages are arranged in parallel, the virtual page loaded with the page content is displayed in the screen window of the touch screen, the other virtual pages are arranged in the invisible edge region of the touch screen, and move to the screen window when the user's finger slides on the touch screen. Based on the displaying of the touch screen, a plurality of parallelly arranged virtual pages can be parallelly arranged in the horizontal direction, or they can be parallelly arranged in the vertical direction.

Specifically, in order to facilitate the arrangement of the virtual pages, the virtual pages are arranged according to coordinates of a point in the edge of the virtual page. In a preferred embodiment, coordinates of the upper left corner are obtained and saved in the form of arrays, and then a plurality of virtual pages are arranged according to the coordinates of the upper left corner of the virtual page.

Figure 3:
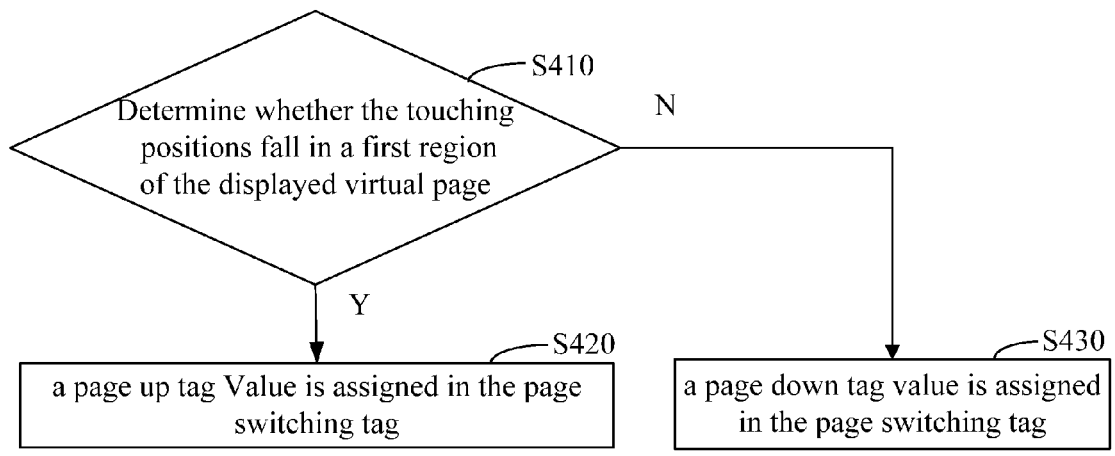
FIG. 3 is a flow chart of a method for switching page according to another embodiment.

Referring to FIG. 3, in another embodiment, after step S30, the method further includes:

Step S410, whether the touching positions fall in a first region of the displayed virtual page is determined, if the touching positions fall in the first region of the displayed virtual page, step S420 is performed, if the touching positions do not fall in the first region of the displayed virtual page, step S430 is performed.

In the illustrated embodiment, the virtual page displayed on screen window of the touch screen is divided into two, if the collected touching positions fall in the first region of the virtual page, the page switching tag tflag is assigned a page up tag value, if the touching positions fall in a second region of the virtual page, the page switching tag tflag is assigned a page down tag value.

Specifically, in a scene where a plurality of virtual pages are arranged in the horizontal direction, if page up, sequentially and parallelly arranged virtual pages slide to the right, if page down, sequentially and parallelly arranged virtual pages slide to the left. Thus, according to the sliding of the virtual page, virtual pages displayed in the window of the touch screen can be divided into a left half region and a right half region in the horizontal direction, wherein the left half region is the first region, the right half region is the second region.

Step S420, a page up tag value is assigned to the page switching tag.

In the illustrated embodiment, after determining the touching positions, a value is assigned to the page switching tag according to a determined result, then the virtual page is page up or page down according to the value in the page switching tag. In a preferred embodiment, a page up tag value can be −1, a page down tag value can be 1.

Step S430, a page down tag value is assigned to the page switching tag.

In the above page switching process, virtual pages are switched through a user's touching on a touching position corresponding to a clicking operation.

In another embodiment, the step S30 specifically includes: touching positions corresponding to a touching starting point and a sliding sampling point are collected respectively in the displayed virtual page.

In the illustrated embodiment, in a user's touching operation on the touch screen, the touching starting point and the sliding sampling point are collected respectively, wherein the sliding sampling point is a sampled touching point in a user's touching operation on the touch screen.

Furthermore, a touching starting event, a touching sliding event, and a touching terminating event are bound in the Div object corresponding to the virtual page in advance, then it is sampled through listening for a triggered event in the Div object.

After the step S30, the method further includes: the page up tag value or the page down tag value is assigned in the page switching tag according to the touching positions corresponding to the touching starting point and the sliding sampling point.

In the illustrated embodiment, the user's sliding direction on the touch screen can be determined according to the touching positions corresponding to the touching starting point and the sliding sampling point, then whether the current operation is to page up or page down is determined according to the sliding direction, then a corresponding value is assigned to the page switching tag, but whether a sliding direction is corresponding to a page up operation or a page down operation can be configured according to the user's habit.

Specifically, the user's sliding direction on the touch screen can be determined according to a comparison between positions of the touching starting point and the sliding sampling point. For example, in a scene where a plurality of virtual pages are parallelly arranged in the horizontal direction, a coordinate system used to characterize the touching positions takes the horizontal rightward direction as positive direction. A rightward sliding direction is corresponding to a page up operation of the virtual page, a leftward sliding direction is corresponding to a page down operation of the virtual page. Thus the user's touching operating direction can be the same as the sliding direction of the virtual page, which facilitates to user's operation. Whether a horizontal coordinate of the sliding sampling point is greater than a horizontal coordinate of the touching starting point is determined, if the horizontal coordinate of the sliding sampling point is greater than the horizontal coordinate of the touching starting point, a page up tag value is assigned to the page switching tag, if the horizontal coordinate of the sliding sampling point is not greater than the horizontal coordinate of the touching starting point, a page down tag value is assigned to the page switching tag. Moreover, a page switching operation corresponding to the sliding direction can be set opposite, the coordinate system used to characterize the touching positions can be set in other forms. A scene where a plurality of virtual pages are parallelly arranged in the vertical direction is similar to that described above, it will not be stated any more.

Figure 4:
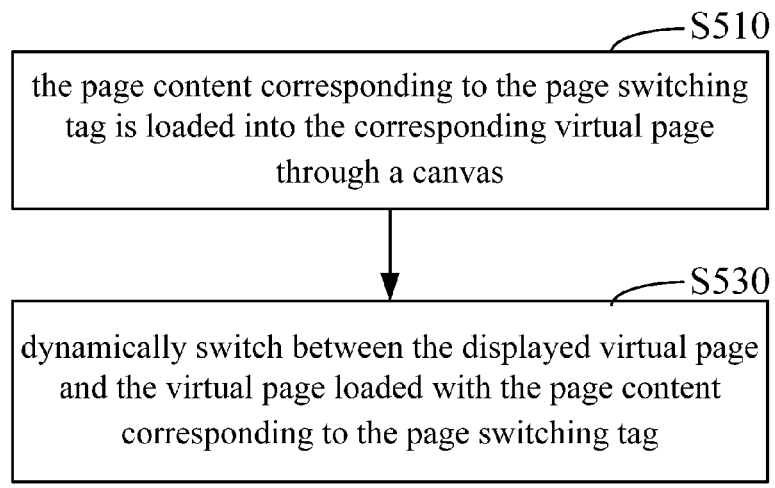
FIG. 4 is a flow chart of performing switching pages to the virtual pages displayed on the touch screen according to touching positions in one embodiment.

Referring to FIG. 4, in one embodiment, the step S50 specifically includes:

Step S510, the page content corresponding to the page switching tag is loaded into the corresponding virtual page via a canvas.

In the illustrated embodiment, after determining whether the user's operation on the touch screen is a page up operation or a page down operation, the virtual page to be switched to the screen window of the touch screen is loaded, and a corresponding page content is loaded into the virtual page to be switched to the screen window of the touch screen via the canvas.

The canvas is a canvas object of Html5 network programming language, characters in the virtual page are drawn through the canvas, the characters are not displayed on the virtual page directly, as the canvas can precisely measure the size of the characters, which facilitates type setting. Moreover, text of the virtual page is converted to a picture through the canvas, which facilitates anti-crawling and anti-hotlinking.

Figure 5:
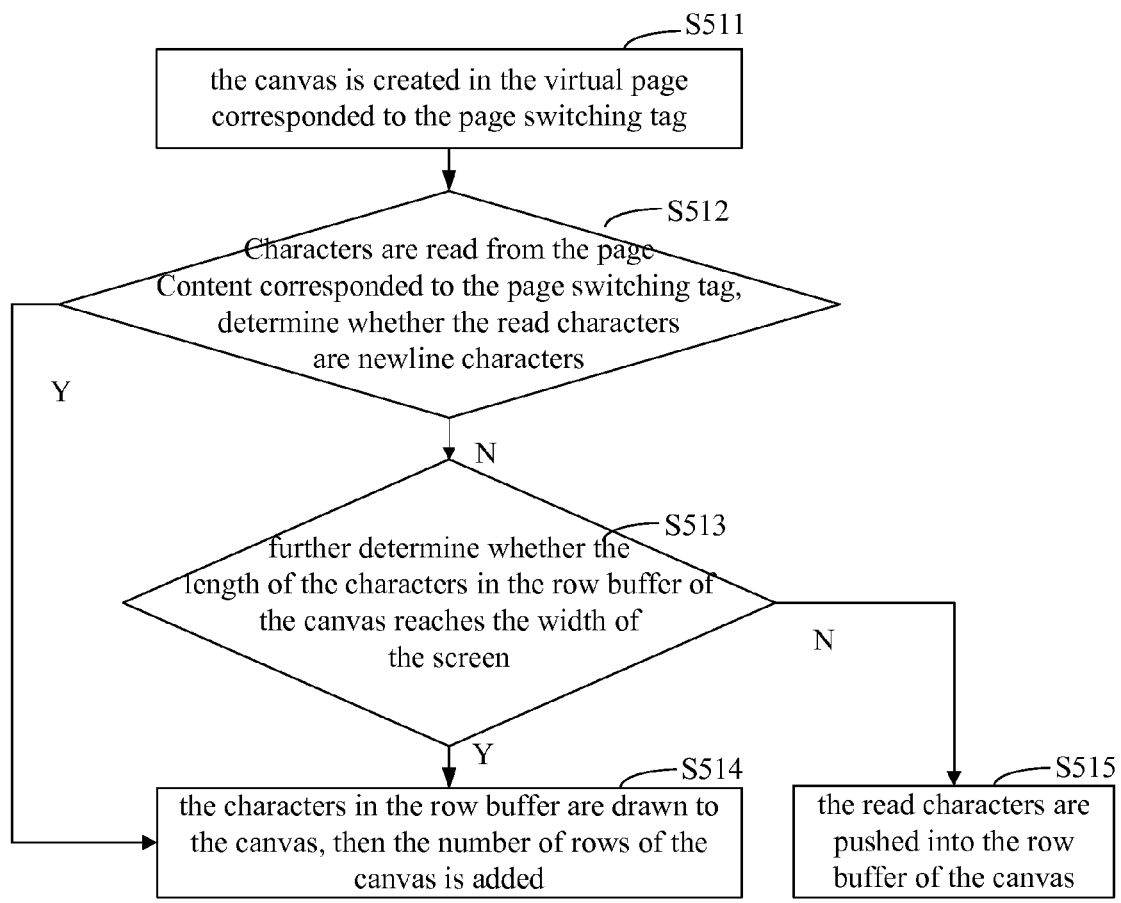
FIG. 5 is a flow chart of loading page content corresponding to a page switching tag into the corresponding virtual page via a canvas in FIG. 4.

Referring to FIG. 5, in one embodiment, the step S510 specifically includes:

Step S511, the canvas is created in the virtual page corresponding to the page switching tag.

In the illustrated embodiment, the canvas object is created, a context object ctx related to the created canvas object is obtained, the context object ctx characterizes a canvas style, and styles such as canvas color, font, and alignment can be set in the created canvas through the context object ctx.

Step S512, characters are read from the page content corresponding to the page switching tag, and whether the read characters are newline characters is determined, if the read characters are not newline characters, step S513 is performed, if the read characters are newline characters, step S514 is performed.

In the illustrated embodiment, a current switched page is determined according to an assigned value of the page switching tag, then data is loaded into the page which is switched and displayed in the screen window of the touch screen. In the data loading process, the page content is extracted and saved in the character array in the form of characters. The characters are then read one by one from the character array, whether the read character is a newline character is determined, if the read character is not the newline character, the read character is saved in a row buffer area, then the characters are drawn row by row in the canvas through the row buffer area. The characters in the canvas are drawn in batches through the row buffer area rather than drawn one by one, thus the drawing speed of the canvas can be increased.

If the read character is the newline character, it indicates that a row of characters have been saved in the row buffer area, it only needs to draw such row of characters in the canvas.

Step S513, whether the length of the characters in the row buffer area of the canvas reaches the width of the screen is further determined, if the length of the characters in the row buffer area of the canvas reaches the width of the screen, step S514 is performed, if the length of the characters in the row buffer area of the canvas does not reach the width of the screen, step S515 is performed.

In the illustrated embodiment, when the read character is not a newline character, the read character needs to be saved in the row buffer area. It also needs to determine whether the space of the row buffer area is sufficient to save characters, if the space of the row buffer area is full, the characters in the row buffer area need to be first drawn in the canvas, then the row buffer area is emptied to save the read characters, if the space of the row buffer area is sufficient to save the read characters, the read characters are saved directly in the row buffer area of the canvas.

Step S514, the characters in the row buffer area are drawn to the canvas, then the number of rows of the canvas is added.

In the illustrated embodiment, when the characters are batchedly drawn row by row, the number of rows of the canvas needs to be added, the number of rows of the drawn characters in the canvas are obtained according to the added number of rows of the canvas.

Step S515, the read characters are pushed into the row buffer area of the canvas.

In another embodiment, after step S514, the method further includes: determining whether the number of rows of the canvas reaches a threshold value, if the number of rows of the canvas reaches the threshold value, step S530 is performed, if the number of rows of the canvas does not reach the threshold value, back to step S512.

In the illustrated embodiment, whether the drawn characters in the canvas have reached the maximum number of processing rows or the end of the page content according to the number of added canvas rows is determined, if the drawn characters in the canvas have reached the maximum number of processing rows or the end of the page content, the virtual page is switched, if the drawn characters in the canvas have not reached the maximum number of processing rows or the end of the page content, characters are read continuously. The threshold value used to determine the number of rows of the canvas can be the maximum processing rows of the virtual page, or it can be obtained according to the height of the screen window or the row height of each row.

Step S530, dynamically switching between the displayed virtual page and the virtual page loaded with the page content corresponding to the page switching tag is performed.

In the illustrated embodiment, after the data of the virtual page to be switched to the screen window is loaded and the canvas is drawn, a switching process between the current displayed virtual page and the virtual page to be switched to the screen window according to a defined animation is performed.

Figure 6:
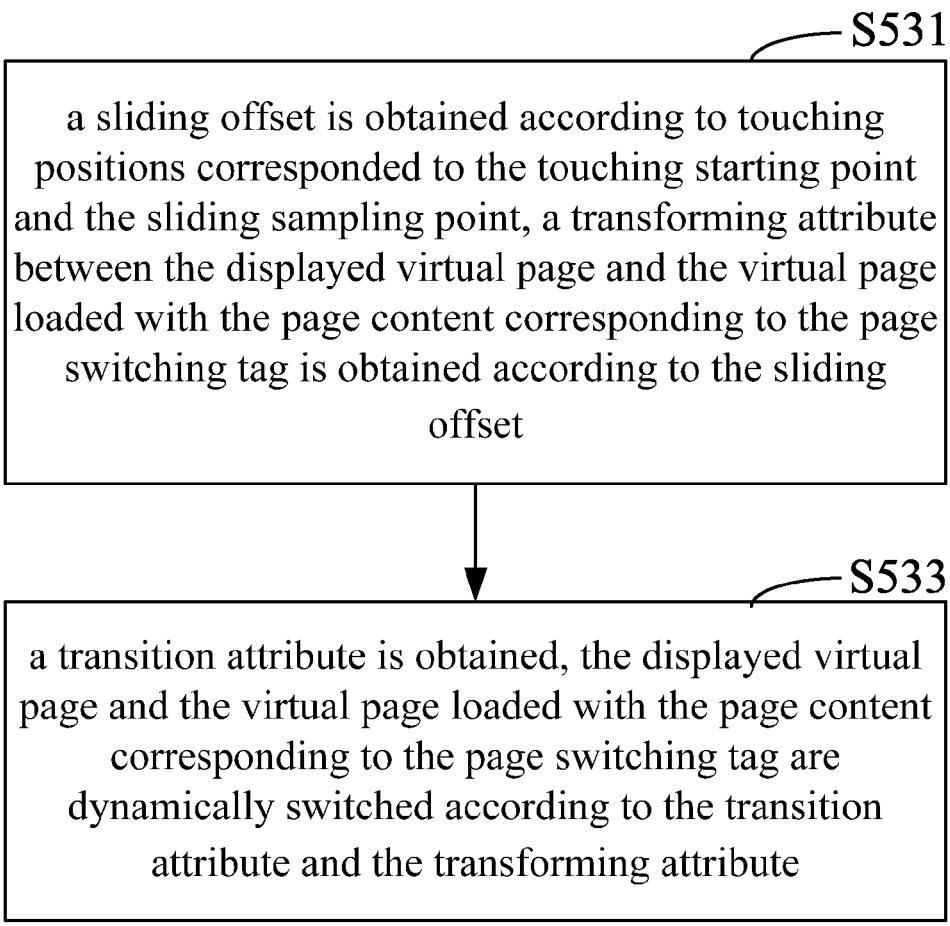
FIG. 6 is a flow chart of dynamically switching between the displayed virtual page and the virtual page loaded with a page content corresponding to the page switching tag in FIG. 4.

Referring to FIG. 6, in one embodiment, the step S530 specifically includes:

Step S531, a sliding offset is obtained according to touching positions corresponding to the touching starting point and the sliding sampling point, a transforming attribute between the displayed virtual page and the virtual page loaded with the page content corresponding to the page switching tag is obtained according to the sliding offset.

In the illustrated embodiment, the sliding offset is obtained through a calculation according to the user's touching sliding operation. For example, in a scene where a plurality of virtual pages is parallelly arranged in the horizontal direction, the sliding offset can be obtained through an abscissa. A displacement of the virtual page is calculated according to the sliding offset and the coordinates of a point on the edge of the virtual page (e.g. coordinates of the upper left corner of the virtual page), the displacement is regarded as the transforming attribute between the virtual pages. For example, for the second virtual page, a corresponding displacement is pos[1]-txt2.offset. The transforming attribute is used to move the virtual page according to the user's touching sliding operation in the dynamic switching process of the virtual page.

Step S533, a transition attribute is obtained, the displayed virtual page and the virtual page loaded with the page content corresponding to the page switching tag are dynamically switched according to the transition attribute and the transforming attribute.

In the illustrated embodiment, the transition attribute is used to set an applied animation when switching the virtual pages, the animation is played according to the transition attribute when switching the virtual page, the virtual page is moved according to the transforming attribute. For example, the transition attribute identifies a duration of the animation is 200 ms, an animation style is "quick start, slow end".

Proprietary transforming attribute and transition attribute of CSS3 in WebKit-based browser are used in the switching process to achieve an animation of switching pages, no additional JavaScript web programming is needed, which increases the efficiency of programming. Moreover, a 3D transforming function is used through the transforming attribute, a 3D accelerating capability is fully used, and thus the playing of the animation is fluent and smooth.

Figure 7:
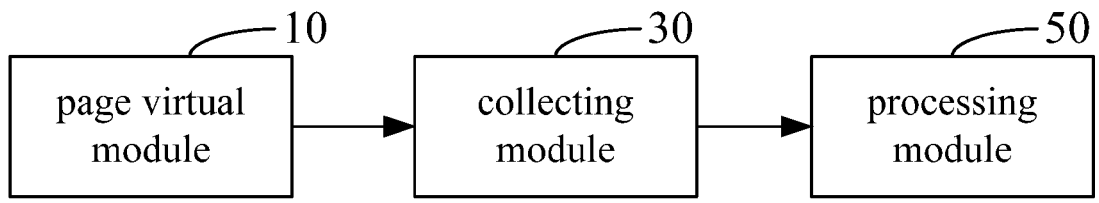
FIG. 7 is a block diagram of an apparatus for switching page according to one embodiment.

Referring to FIG. 7, an embodiment of an apparatus for switching page is shown. In some implementations, the apparatus at least includes one or more processors (e.g., central processing units) and a memory for storing data, programs and instructions for execution by one or more processors. The memory or alternatively non-transitory computer readable storage medium of memory stores the following programs, modules and data structures, instructions, or a subset thereof: a page virtual module 10, a collecting module 30, and a processing module 50.

The page virtual module 10 is configured to create a plurality of sequential virtual pages through loading a page script, and display the virtual pages on the touch screen.

In one embodiment, the page script records a corresponding page style, the page can be loaded through a browser and the page script, then it is displayed in the browser interface. Specifically, the page virtual module 10 obtains the page script according to a user's browsing request, then a plurality of sequential virtual pages are created in a loading process of the page script, the virtual page corresponding to a browsing page requested by a user is displayed on the touch screen.

The virtual page is a Div object, data in each virtual page can be saved in the form of arrays. The number of the virtual pages created by the page virtual module 10 is three, the three virtual pages correspond to a browsing page requested by a user, and a previous page and a next page adjacent to the browsing page requested by the user, correspondingly, the previous page, the browsing page requested by the user and the next page are saved by arrays of txt[1], txt[2], and txt[3]. Under the premise of saving storage space, three sequential virtual pages are created by the page virtual module 10, fluency and smoothness can be ensured in the process of switching page, thus the switching page is advantageously achieved in a mobile terminal. Moreover, the page virtual module 10 achieves a page switching through the virtual page, the created virtual pages can be reused in further switching page process, object creating operations can be minimized, and the performance is improved.

Furthermore, the page script is achieved through HTML5 web page programming language, a process of opening a webpage is a process of obtaining the page script and loading the page script, which can be accomplished by the page virtual module 10 through load event or DOMContentLoaded event of the page. Thus an initialization function of creating the virtual page can be registered in advance to the handling hook of the load event or the DOMContentLoaded event of the page.

The collecting module 30 is configured to collect touching positions in the displayed virtual page.

In the illustrated embodiment, a contacting point between the user and the touch screen is a touching point, the corresponding touching positions collected by the collecting module 30 can be characterized by coordinates.

The collecting module 50 is configured to perform switching pages to the virtual pages displayed on the touch screen according to the touching positions.

In the illustrated embodiment, an operating intention on the touch screen of the user can be determined by the processing module 50 according to the collected touching positions, then the processing module 50 determines whether the virtual page displayed on the touch screen is page up or page down, thus page switching between the displayed virtual page and adjacent virtual page can be achieved.

Figure 8:
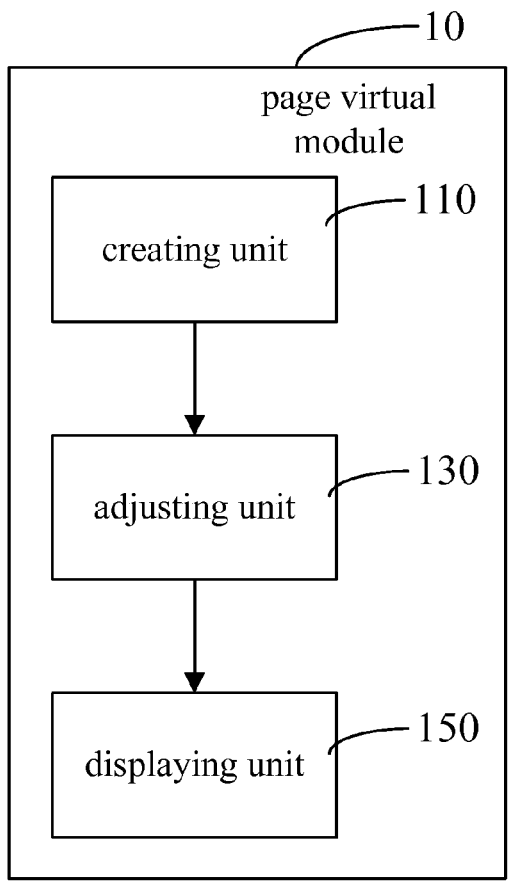
FIG. 8 is a block diagram of a page virtual module in FIG. 7.

Referring to FIG. 8, in one embodiment, the page virtual module 10 includes a creating unit 110, an adjusting unit 130, and a displaying unit 150.

The creating unit 110 is configured to trigger creating a plurality of sequential virtual pages through loading the page script, and load page content recorded in the page script into a corresponding virtual page.

In the illustrated embodiment, the creating unit 110 creates a plurality of virtual pages in a loading process of the page script, a plurality of pages corresponding to the created virtual pages are sequential, for example, the three created virtual pages are corresponding to the $5^{th}$ page, the $6^{th}$ page, and the $7^{th}$ page respectively.

The page script records information such as page style and page content, thus the creating unit 110 obtains recorded page content from the page script in the loading process of the page script, and then loads the page content into the virtual page. For example, in the three virtual pages corresponding to the $5^{th}$, $6^{th}$, and $7^{th}$ created page, according to the above description, the loaded page script is the page script of the $6^{th}$ page, after the page content is extracted by the creating unit 110 from the page script, the page content is loaded into the second virtual page of the three sequential virtual pages, the page content will be saved in the form of arrays.

The adjusting unit 130 adjusts the virtual page to match the virtual page with the touch screen.

In the illustrated embodiment, the adjusting unit 130 adjusts the size of the virtual page according to the size of the window of the touch screen to meet a need of full screen reading or reading in other modes. For example, the adjusting unit 130 adjusts the height and width of the virtual page, and makes the width and height of the virtual page match the width and height of the window of the screen, then the virtual page is displayed in full screen for users.

The displaying unit 150 is configured to display the virtual page loaded with the page content on the touch screen, the virtual page adjacent to the displayed virtual page is arranged in parallel with the displayed virtual page in the invisible edge region of the touch screen.

In the illustrated embodiment, the displaying unit 150 parallelly arranges a plurality of sequential virtual pages, the virtual page loaded with the page content is displayed in the screen window of the touch screen, the other virtual pages are arranged in the invisible edge region of the touch screen, and move to the screen window when the user's finger slides on the touch screen. According to the displaying of the touch screen, a plurality of parallelly arranged virtual pages can be parallelly arranged in the horizontal direction, or they can be parallelly arranged in the vertical direction.

Specifically, in order to facilitate the arrangement of the virtual pages, the displaying unit 150 arranges the virtual pages according to coordinates of a point in the edge of the virtual page. In a preferred embodiment, the displaying unit 150 obtains coordinates of the upper left corner and saves them in the form of arrays, then a plurality of virtual pages are arranged according to the coordinates of the upper left corner of the virtual page.

Figure 9:
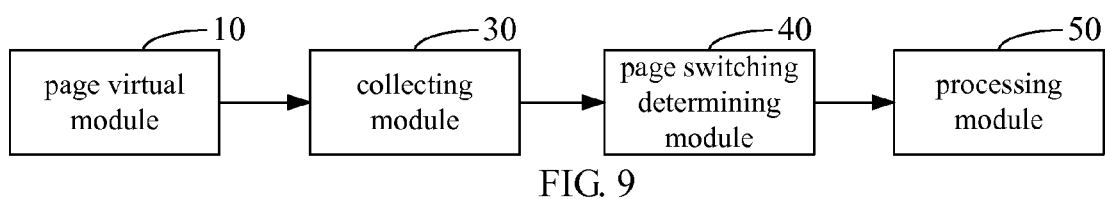
FIG. 9 is a block diagram of an apparatus for switching page according to another embodiment.

Referring to FIG. 9, in another embodiment, the apparatus for switching page further includes a page switching determining module 40. The page switching determining module 40 is configured to determine whether the touching positions fall in a first region of the displayed virtual page, if the touching positions fall in the first region of the displayed virtual page, a page up tag value is assigned in the page switching tag, if the touching positions are not in the first region of the displayed virtual page, a page down tag value is assigned in the page switching tag.

In the illustrated embodiment, the virtual page displayed on screen window of the touch screen is divided into two, if the page switching determining module 40 determines that the collected touching positions fall in the first region of the virtual page, the page switching tag tflag is assigned a page up tag value, if the touching positions fall in a second region of the virtual page, the page switching tag tflag is assigned a page down tag value.

Specifically, in a scene where a plurality of virtual pages are arranged in the horizontal direction, if page up, sequentially and parallelly arranged virtual pages move to the right, if page down, sequentially and parallelly arranged virtual pages slide to the left. Thus virtual pages displayed in the window of the touch screen can be divided into a left half region and a right half region in the horizontal direction, wherein the left half region is the first region, the right half region is the second region.

After the touching positions are determined, the page switching determining module 40 assigns a value to the page switching tag according to a determined result, then the virtual page is page up or page down according to the value in the page switching tag. In a preferred embodiment, a page up tag value can be minus one (also can indicated as "−1"), a page down tag value can be one (also can indicated as "1").

In the above page switching process, virtual pages are switched through a user's touching on a touching position corresponding to a touching operation.

In another embodiment, the collecting module 30 is also configured to collect touching positions corresponding to a touching starting point and a sliding sampling point respectively on the displayed virtual page.

In the illustrated embodiment, in a user's touching operation on the touch screen, the collecting module 30 collects the touching starting point and the sliding sampling point respectively, wherein the sliding sampling point is a collected touching point in a user's touch operation on the touch screen.

Furthermore, a touching starting event, a touching sliding event, and a touching terminating event are bound in the Div object corresponding to the virtual page in advance, then the collecting module 30 collects touching positions through listening for a triggered event in the Div object.

Figure 10:
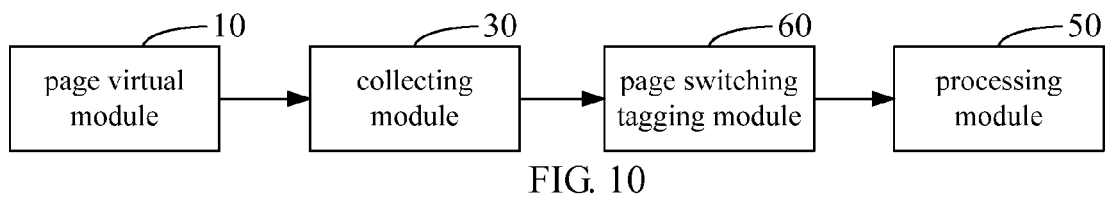
FIG. 10 is a block diagram of an apparatus for switching page according to yet another embodiment.

Referring to FIG. 10, the above apparatus for switching page further includes a page switching tagging module 60, the page switching tagging module 60 is configured to assign the page up tag value or the page down tag value in the page switching tag according to the touching positions corresponding to the touching starting point and the sliding sampling point.

In the illustrated embodiment, the page switching tagging module 60 is configured to determine the user's sliding direction on the touch screen according to the touching positions corresponding to the touching starting point and the sliding sampling point, then whether a current operation is to page up or page down according to the sliding direction is determined, then a corresponding value is assigned to the page switching tag, but whether a sliding direction is corresponding to a page up operation or a page down operation can be determined according to the user's habit.

Specifically, the user's sliding direction on the touch screen can be determined according to a comparison between positions of the touching starting point and the sliding sampling point. For example, in a scene where a plurality of virtual pages are parallelly arranged in the horizontal direction, a coordinate system used to characterize the touching positions uses a horizontal rightward direction as the positive direction. A rightward sliding direction is corresponding to a page up operation of the virtual page, a leftward sliding direction is corresponding to a page down operation of the virtual page. Thus the user's touching operating direction can be the same as the sliding direction of the virtual page, which facilitates user's operation. The page switching tagging module 60 is configured to determine whether a horizontal coordinate of the sliding sampling point is greater than a horizontal coordinate of the touching starting point, if the horizontal coordinate of the sliding sampling point is greater than the horizontal coordinate of the touching starting point, a page up tag value is assigned to the page switching tag, if the horizontal coordinate of the sliding sampling point is not greater than the horizontal coordinate of the touching starting point, a page down tag value is assigned to the page switching tag. Moreover, a page switching operation corresponding to the sliding direction can be oppositely set, the coordinate system used to characterize the touching positions can be set to other forms. A scene where a plurality of virtual pages are parallelly arranged in the vertical direction is similar as that described above, it will not be stated any more.

Figure 11:
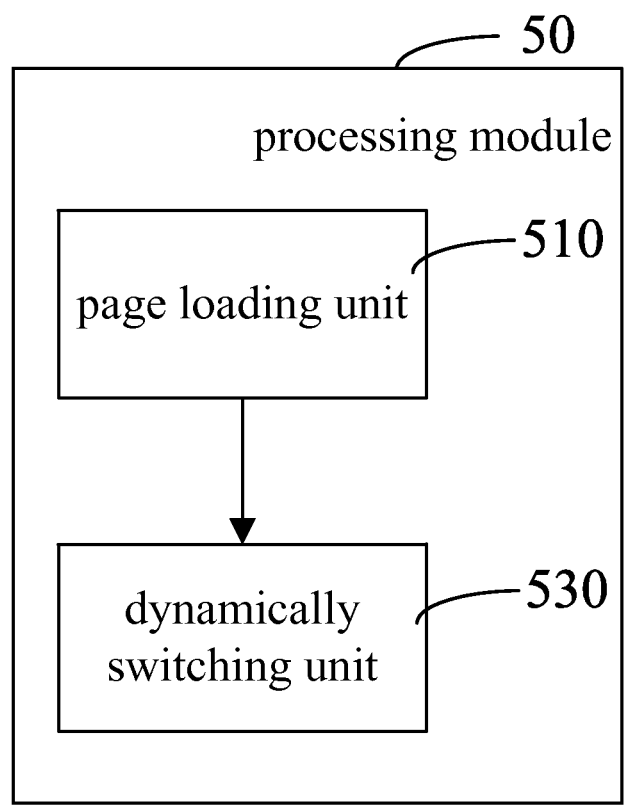
FIG. 11 is a block diagram of a processing module according to one embodiment.

Referring to FIG. 11, in one embodiment, the processing module 50 includes a page loading unit 510 and a dynamically switching unit 530.

The page loading unit 510 is configured to load the page content corresponding to the page switching tag into the corresponding virtual page via the canvas.

In the illustrated embodiment, after whether the user's operation on the touch screen is a page up operation or a page down operation is determined, the page loading unit 510 loads the virtual page to be switched to the screen window of the touch screen, a corresponding page content is loaded into the virtual page to be switched to the screen window of the touch screen.

The canvas is a canvas object of Html5 network programming language, the page loading unit 510 draws characters in the virtual page via the canvas, the characters are not displayed on the virtual page directly, as the canvas can precisely measure the size of the characters, the characters are drawn via the canvas, which facilitates type setting. Moreover, text of the virtual page is converted to a picture through the canvas, which facilitates anti crawling and anti embezzlement.

Figure 12:
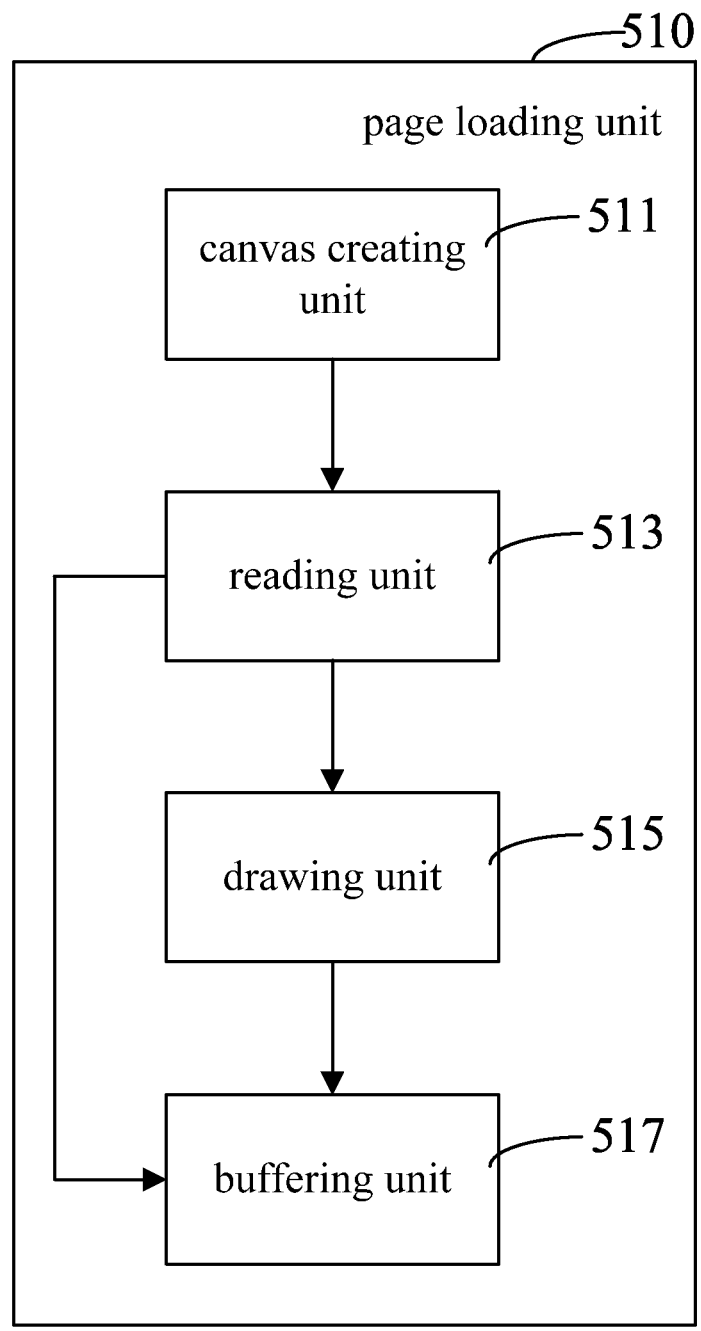
FIG. 12 is a block diagram of a page loading unit in FIG. 11.

Referring to FIG. 12, in one embodiment, the page loading unit 510 includes a canvas creating unit 511, a reading unit 513, a drawing unit 515, and a buffering unit 517.

The canvas creating unit 511 is configured to create the canvas in the virtual page corresponding to the page switching tag.

In the illustrated embodiment, the canvas creating unit 511 creates the canvas object, a context object ctx related to the created canvas object is obtained, the context object ctx characterizes a canvas style, and styles such as canvas color, font, and alignment can be set in the created canvas through the context object ctx.

The reading unit 513 is configured to read characters from the page content corresponding to the page switching tag, and determine whether the read characters are newline characters, if the read characters are newline characters, the drawing unit 515 is notified, if the read characters are not newline characters, further determine whether the length of characters in the row buffer area of the canvas reaches the width of the screen, if the length of characters in the row buffer area of the canvas reaches the width of the screen, the drawing unit 515 is notified, if the length of characters in the row buffer area of the canvas does not reach the width of the screen, the buffering unit 517 is notified.

In the illustrated embodiment, a current switched page is determined according to an assigned value of the page switching tag, then data is loaded into the page which is switched and displayed in the screen window of the touch screen. In a data loading process, the reading unit 513 obtains the page content and saves the read page content in the character array in the form of characters and then read characters one by one from the character array. Whether the read character is a newline character is determined, if the read character is not the newline character, the buffering unit 517 is notified to save the read character a row buffer area, and then the drawing unit 515 draw characters row by row in the canvas through the row buffer area. The drawing unit 515 batchedly draw characters in the canvas through the row buffer area, characters are not drawn one by one, thus the drawing speed of the canvas can be increased.

When the reading unit 513 determines that the read character is not a newline character, the read character needs to be saved in the row buffer area, it also needs to determine whether the space of the row buffer area is sufficient to save characters, if the space of the row buffer area is full, the drawing unit 515 is notified to draw the characters in the row buffer area to the canvas, then the row buffer area is emptied to save the read characters, if the space of the row buffer area is sufficient to save the read characters, the buffering unit 517 is notified to save the read characters directly in the row buffer area of the canvas.

If the reading unit 513 determines that the read character is the newline character, it indicates that a row of characters have been saved in the row buffer area, it only needs to draw the row of characters in the canvas.

The drawing unit 515 is configured to draw the characters in the row buffer area to the canvas, and then add the number of rows of the canvas.

In the illustrated embodiment, when the drawing unit 515 batchedly draw the characters row by row, the number of rows of the canvas needs to be added, the number of rows of the drawn characters in the canvas are obtained according to the added number of rows of the canvas.

The buffering unit 517 is configured to push the read characters into the row buffer area of the canvas.

In another embodiment, the drawing unit 515 is also configured to determine whether the number of rows of the canvas reaches a threshold value, if the number of rows of the canvas reaches the threshold value, the dynamically switching unit 530 is notified, if the number of rows of the canvas does not reach the threshold value, the reading unit 513 is notified.

In the illustrated embodiment, the drawing unit 515 determine whether the drawn characters in the canvas have reached the maximum number of processing rows or the end of the page content according to the number of added canvas rows, if the drawn characters in the canvas have reached the maximum number of processing rows or the end of the page content, the dynamically switching unit 530 is notified to switch the virtual page, if the drawn characters in the canvas have not reached the maximum number of processing rows or the end of the page content, the reading unit 513 is notified to continue to read characters. The threshold value used to determine the number of canvas rows can be the maximum processing rows of the virtual page, or it can be obtained according to the height of the screen window or the row height of each row.

The dynamically switching unit 530 is configured to dynamically switch between the displayed virtual page and the virtual page loaded with the page content corresponding to the page switching tag.

In the illustrated embodiment, after the data of the virtual page to be switched to the screen window is loaded and the canvas is drawn, the dynamically switching unit 530 performs a switching process between the current displayed virtual page and the virtual page to be switched to the screen window according to a defined animation.

Figure 13:
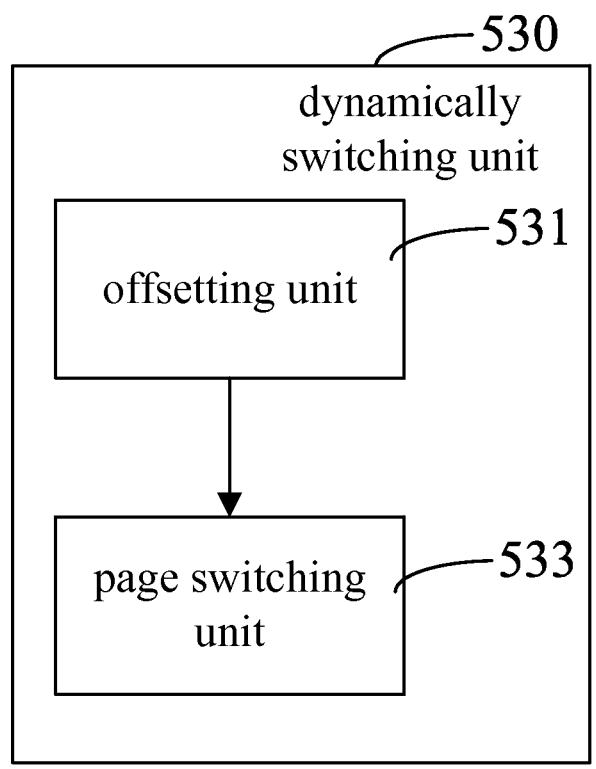
FIG. 13 is a block diagram of a dynamically switching unit in FIG. 11.

Referring to FIG. 13, in one embodiment, the dynamically switching unit 530 includes an offsetting unit 531 and a page switching unit 533.

The offsetting unit 531 is configured to obtain a sliding offset according to touching positions corresponding to the touching starting point and the sliding sampling point, a transforming attribute between the displayed virtual page and the virtual page loaded with the page content corresponding to the page switching tag is obtained according to the sliding offset.

In the illustrated embodiment, the offsetting unit 531 obtains the sliding offset through a calculation using the user's touching sliding operation. For example, in a scene where a plurality of virtual pages are parallelly arranged in the horizontal direction, the sliding offset can be obtained through an abscissa. A displacement of the virtual page is calculated according to the sliding offset and the coordinates of a point on the edge of the virtual page (e.g. coordinates of the upper left corner of the virtual page), the displacement is regarded as the transforming attribute between the virtual pages. For example, for the second virtual page, a corresponding displacement is pos[1]-txt2.offset. The transforming attribute is used to move the virtual page according to the user's touching sliding operation in the dynamic switching process of the virtual page.

The page switching unit 533 is configured to obtain a transition attribute, and dynamically switch the displayed virtual page and the virtual page loaded with the page content corresponding to the page switching tag according to the transition attribute and the transforming attribute.

In the illustrated embodiment, the transition attribute is used to set an applied animation when switching the virtual pages, the page switching unit 533 plays the animation according to the transition attribute when switching the virtual page, the virtual page is moved according to the transforming attribute. For example, the transition attribute identifies a duration of the animation is 200 ms, an animation style is "quick start, slow end".

In the above method, apparatus and computer storage medium for switching page, a plurality of sequential virtual pages are created through loading the page script, and then they are displayed on the screen. Touching positions in the displayed virtual page are collected, a switching process is performed to virtual pages corresponding to several pages according to the touching positions, in the above switching process, the corresponding page script is directly loaded by different browsers, the server side is uniformly planed, and it is applied to different browsers. Virtual page can be switched by any browser according to the page script, a page switching of cross-browser platform is enabled.

The above method, apparatus, and computer storage medium for switching page are achieved through HTML5 web programming language, a native programming of a terminal platform is not needed, and additional plug-ins are not needed, the above method, apparatus, and computer storage medium are compatible with a variety of terminal platforms, the server side can be uniformly planed, published, and upgraded, thus the convenience of the processing of the server side is improved.

It can be understood by those skilled in the art that the whole or parts of the process of the method in the above embodiment can be achieved by computer program instructing related hardware, the computer program is stored in a computer readable storage medium, when the program is executed, it can include such as process of the embodiment of the above each method. The storage medium can be diskette, compact disc, Read-Only Memory (ROM) or Random Access Memory (RAM), and so on.

Although the present invention has been described with reference to the embodiments thereof and the best modes for carrying out the present invention, it is apparent to those skilled in the art that a variety of modifications and changes may be made without departing from the scope of the present invention, which is intended to be defined by the appended claims.

What is claimed is:

1. A method for switching browsing pages in a cross-browser platform, comprising the following steps:

creating, by one or more processors of an electronic device, a plurality of sequential virtual pages through loading a page script from a plurality of browsing pages to display each of the virtual pages on a touch screen of the electronic device, wherein the each of the virtual pages corresponds to one of the browsing pages, the browsing pages are displayed in the cross-browser platform and the virtual pages adjacent to the displayed virtual page are arranged in parallel with the displayed virtual page in an invisible edge region of the touch screen;

displaying, by one or more processors of the electronic device, one virtual page loaded of the created plurality of sequential virtual pages with the page content on the touch screen, parallelly arranging virtual pages adjacent to the displayed virtual pages in the invisible region of the edge of the touch screen;

collecting, by one or more processors of the electronic device, touching positions from a user on the one displayed virtual page with the page content on the touch screen, wherein the collecting touching positions further comprises determining whether the collected touching position is located in a first region of the displayed virtual page, and in response to the collected touching position is located in a first region of the displayed virtual page, assigning a page up tag value in a page switching tag, and determining whether the collected touching position is located in a second region of the displayed virtual page, and in response to the collected touching position is located in a second region of the displayed virtual page, assigning a page down tag value in the page switching tag;

determining, by one or more processors of the electronic device, an operating intent of the user on the touch screen according to the collected touching positions to identify whether the displayed virtual page on the touch screen is a page up or a page down;

performing, by one or more processors of the electronic device, switching the browsing pages in the cross-browser platform to the virtual pages displayed on the touch screen of the electronic device according to the touching positions of the user by dynamically switching between the displayed virtual page and the virtual page loaded with the page content corresponding to the page switching tag; and in response to performing switching the browsing pages in the cross-browser platform, loading page content corresponding to the page switching tag into a corresponding virtual page via a canvas by creating the canvas in the virtual page corresponding to the page switching tag and reading a character from the page content corresponding to the page switching tag and determining whether the character being a newline character, if not, further determining whether the length of characters in a row buffer area of the canvas reaching the length of the screen, if so, drawing the characters in the row buffer area to the canvas, and adding up the number of rows of the canvas, if not, pushing the read characters to the row buffer area of the canvas.

2. The method according to claim 1, wherein the step of creating a plurality of sequential virtual pages through loading a page script, and displaying the virtual pages on the touch screen comprises: creating the plurality of sequential virtual pages triggered through loading the page script, and loading page content recorded in the page script into the corresponding virtual pages; and adjusting the virtual page to match the virtual pages with the touch screen.

3. The method according to claim 1, wherein the step of collecting touching positions on displayed virtual pages comprises: collecting touching positions corresponding to a touching starting point and a sliding sampling point respectively on the displayed virtual pages; and after the step of collecting touching positions on displayed virtual pages, the method further comprises: assigning a page up tag value or a page down tag value in a page switching tag according to the touching positions corresponding to the touching starting point and the sliding sampling point respectively.

4. The method according to claim 1, wherein the step of loading the page content corresponding to the page switching tag into the corresponding virtual page via the canvas further comprises: if the read character is determined to be the newline character, entering a step of drawing the characters of the row buffer area to the canvas, and adding up the number of rows of the canvas.

5. The method according to claim 1, wherein after the step of adding up the number of rows of the canvas, the method further comprises: determining whether the number of rows of the canvas reaching a threshold value, if so, entering the step of dynamically switching between the displayed virtual page and the virtual page loaded with the page content corresponding to the page switching tag, if not, entering the step of reading a character from the page content corresponding to the page switching tag.

6. The method according to claim 1, wherein the step of dynamically switching between the displayed virtual page and the virtual page loaded with the page content corresponding to the page switching tag comprises: obtaining a sliding offset according to the touching positions corresponding to the touching starting point and the sliding sampling point, and obtaining a transforming attribute between the displayed virtual page and the virtual page loaded with the page content corresponding to the page switching tag; and obtaining a transition attribute, and dynamically switching between the displayed virtual page and the virtual page loaded with the page content corresponding to the page switching tag according to the transition attribute and the transforming attribute.

7. An electronic device for switching browsing pages in a cross-browser platform, comprising:

a touch screen;

one or more processors; and a memory having instructions stored thereon, the instructions, when executed by the one or more processors, cause the processors to perform operations comprising:

creating a plurality of sequential virtual pages through loading a page script from a plurality of browsing pages to display each of the virtual pages on the touch screen, wherein the each of the virtual pages corresponds to one of the browsing pages, the browsing pages are displayed in the cross-browser platform and the virtual pages adjacent to the displayed virtual page are arranged in parallel with the displayed virtual page in an invisible edge region of the touch screen;

displaying one virtual page loaded of the created plurality of sequential virtual pages with the page content on the touch screen and parallelly arranging the plurality of sequential virtual pages adjacent to the displayed virtual pages in an invisible region of the edge of the touch screen;

collecting touching positions from a user on the one displayed virtual pages page with the page content on the touch screen, wherein the collecting touching positions further comprises determining whether the collected touching position is located in a first region of the displayed virtual page, and in response to the collected touching position is located in a first region of the displayed virtual page, assigning a page up tag value in a page switching tag, and determining whether the collected touching position is located in a second region of the displayed virtual page, and in response to the collected touching position is located in a second region of the displayed virtual page, assigning a page down tag value in the page switching tag;

determining an operating intent of the user on the touch screen according to the collected touching positions to identify whether the displayed virtual page on the touch screen is a page up or a page down;

performing switching the browsing pages in the cross-browser platform to the virtual pages displayed on the touch screen according to the touching positions of the user by dynamically switching between the displayed virtual page and the virtual page loaded with the page content corresponding to the page switching tag; and in response to performing switching the browsing pages in the cross-browser platform, loading page content corresponding to the page switching tag into a corresponding virtual page via a canvas by creating the canvas in the virtual page corresponding to the page switching tag and reading a character from the page content corresponding to the page switching tag and determining whether the character being a newline character, if not, further determining whether the length of characters in a row buffer area of the canvas reaching the length of the screen, if so, drawing the characters in the row buffer area to the canvas, and adding up the number of rows of the canvas, if not, pushing the read characters to the row buffer area of the canvas.

8. The electronic device according to claim 7, wherein the memory further comprises instructions, which, when executed by the one or more processors, cause the processors to perform operations comprising: triggering creating a plurality of sequential virtual pages through loading the page script, and loading page content recorded in the page script into corresponding virtual pages; and adjusting the virtual page to match the virtual pages with the touch screen.

9. The electronic device according to claim 7, wherein the memory further comprises instructions, which, when executed by the one or more processors, cause the processors to perform operations comprising: collecting touching positions corresponding to a touching starting point and a sliding sampling point respectively on the displayed virtual pages; and assigning a page up tag value or a page down tag value in the page switching tag according to the touching positions corresponding to the touching starting point and the sliding sampling point respectively.

10. The electronic device according to claim 7, wherein the memory further comprises instructions, which, when executed by the one or more processors, cause the processors to perform operations comprising: if the read character is determined to be the newline character, entering a step of drawing the characters of the row buffer area to the canvas, and adding up the number of rows of the canvas.

11. The electronic device according to claim 7, wherein the memory further comprises instructions, which, when executed by the one or more processors, cause the processors to perform operations comprising: determining whether the number of rows of the canvas reaching a threshold value, if so, dynamically switching between the displayed virtual page and the virtual page loaded with the page content corresponding to the page switching tag, if not, reading a character from the page content corresponding to the page switching tag.

12. The electronic device according to claim 7, wherein the memory further comprises instructions, which, when executed by the one or more processors, cause the processors to perform operations comprising: obtaining a sliding offset according to touching positions corresponding to the touching starting point and the sliding sampling point, and obtaining a transforming attribute between the displayed virtual page and the virtual page loaded with the page content corresponding to the page switching tag according to the sliding offset; and obtaining a transition attribute, and dynamically switching between the displayed virtual page and the virtual page loaded with the page content corresponding to the page switching tag according to the transition attribute and the transforming attribute.

13. A non-transitory computer readable storage medium for storing computer executable instruction, which, when executed by one or more processors of an electronic device, causes the one or more processors to perform a method for switching browsing page in a cross-browser platform, wherein the method comprises:

creating a plurality of sequential virtual pages through loading a page script from a plurality of browsing pages to display each of the virtual pages on a touch screen of the electronic device, wherein the each of the virtual pages corresponds to one of the browsing pages, the browsing pages are displayed in a cross-browser platform and the virtual pages adjacent to the displayed virtual page are arranged in parallel with the displayed virtual page in an invisible edge region of the touch screen;

displaying one virtual page loaded of the created plurality of sequential virtual pages with the page content on the touch screen and parallelly arranging the plurality of sequential virtual pages adjacent to the displayed virtual pages in the invisible region of the edge of the touch screen;

collecting touching positions from a user on the one displayed virtual page with the page content on the touch screen, wherein the collecting touching positions further comprises determining whether the collected touching position is located in a first region of the displayed virtual page, and in response to the collected touching position is located in a first region of the displayed virtual page, assigning a page up tag value in a page switching tag, and determining whether the collected touching position is located in a second region of the displayed virtual page, and in response to the collected touching position is located in a second region of the displayed virtual page, assigning a page down tag value in the page switching tag;

determining an operating intent of the user on the touch screen according to the collected touching positions to identify whether the displayed virtual page on the touch screen is a page up or a page down;

performing switching the browsing pages in the cross-browser platform to the virtual pages displayed on the touch screen according to the touching positions of the user dynamically switching between the displayed virtual page and the virtual page loaded with the page content corresponding to the page switching tag; and in response to performing switching the browsing pages in the cross-browser platform, loading page content corresponding to the page switching tag into a corresponding virtual page via a canvas by creating the canvas in the virtual page corresponding to the page switching tag and reading a character from the page content corresponding to the page switching tag and determining whether the character being a newline character, if not, further determining whether the length of characters in a row buffer area of the canvas reaching the length of the screen, if so, drawing the characters in the row buffer area to the canvas, and adding up the number of rows of the canvas, if not, pushing the read characters to the row buffer area of the canvas.

\* \* \* \* \*